United States Patent [19]

Mitchell

[11] Patent Number: 5,062,697.

[45] Date of Patent: Nov. 5, 1991

[54] PORTABLE MICROSCOPE APPARATUS

[76] Inventor: Phillip R. Mitchell, 20½ Dexter St., Apt. I, Providence, R.I. 02909

[21] Appl. No.: 564,118

[22] Filed: Aug. 8, 1990

[51] Int. Cl.$^5$ .................. G02B 21/06; G02B 21/24; G02B 21/34; G02B 25/02

[52] U.S. Cl. .................. 359/379; 359/385; 359/391; 359/396; 359/398; 359/799; 359/801; 359/823

[58] Field of Search ............. 350/518, 523, 529, 534, 350/536, 235, 236, 238, 239, 507, 255, 410

[56] References Cited

U.S. PATENT DOCUMENTS

| | | | |
|---|---|---|---|
| 1,418,645 | 6/1922 | Hensoldt | 350/255 |
| 2,635,504 | 4/1953 | Hawkins | 350/238 |
| 3,582,181 | 6/1971 | deChueca | 350/238 |
| 4,089,593 | 5/1978 | Bernard et al. | 350/238 |
| 4,192,580 | 3/1980 | Meyer | 350/238 |
| 4,361,377 | 11/1982 | Pulleh | 350/523 |
| 4,737,016 | 4/1988 | Russell et al. | 350/239 |
| 4,815,835 | 3/1989 | Corona | 350/518 |
| 4,968,125 | 11/1990 | Rodriquez | 350/523 |

FOREIGN PATENT DOCUMENTS

| | | | |
|---|---|---|---|
| 422322 | 7/1947 | Italy | 350/518 |
| 2076556 | 12/1981 | United Kingdom | 350/518 |

Primary Examiner—Jon W. Henry
Attorney, Agent, or Firm—Leon Gilden

[57] ABSTRACT

An apparatus including a first and second cylindrical body member separately and coaxially mounted relative to one another with the first body member including a resilient perimeter eye piece mounted about a forward terminal end thereof to permit viewing interiorly of the first cylindrical body member through a focusing lens. The focusing lens coaxially aligned with a plurality of fixed lenses positioned forwardly of a slide receptacle for a slide member directed therethrough for sampling of various blood samples therewithin. A sample transparency is positionable forwardly of the slide member to permit visual observation of normal and abnormal blood samples for comparison with a sample mounted within the slide member. Illumination means is mounted rearwardly of the slide member.

8 Claims, 5 Drawing Sheets

PRIOR ART

PORTABLE MICROSCOPE APPARATUS

BACKGROUND OF THE INVENTION

1. Field of the Invention

The field of the invention relates to microscope apparatus, and more particularly pertains to a new and improved portable microscope apparatus wherein the same is easily transported and stored during periods of non-use and readily mounted and utilized for observation of various blood samples.

2. Description of the Prior Art

Microscopes of various types have been utilized in the prior art but however have heretofore failed to permit utilization particularly for observation and comparison of a blood sample relative to patterns positioned relative to the blood sample for ease of understanding acknowledgement of blood sample characteristics of an associated specimen as is presented by the instant invention. While prior art microscopes have been utilized, they have been particularly of an organization not suited for immediate comparison relative to sample patterns as set forth by the instant invention. For example U.S. Pat. No. 4,737,016 to RUSSELL et al sets forth a portable hand held microscope with a support container positioned in coaxial alignment with a viewing lens of a microscope for observation of a sample.

U.S. Pat. No. 4,786,155 to FANTONE et al sets forth a microscope organization of a relatively elaborate and conventional construction.

U.S. Pat. No. 4,527,870 to PSMAY sets forth a portable microscope for use in inspecting fiber optic cables.

U.S. Pat. No. 4,595,265 to HODGSON sets forth a field microscope of a relatively elaborate and cumbersome construction as opposed to that of the instant invention.

U.S. Pat. No. 4,361,377 to PULLEN sets forth a further example of a portable microscope including a spring loaded slide holder positioned forwardly of an objective lens.

As such, it may be appreciated that there continues to be a need for a new and improved portable microscope apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of portable microscope apparatus present in the prior art, the present invention provides a new and improved portable microscope apparatus wherein the same permits utilization of a sample specimen for relative observation relative to a specimen to be analyzed. As such, the general purpose of the present invention, which will be described subsequently in greater detail, is to provide a new and improved portable microscope apparatus which has all the advantages of the prior art portable microscope apparatus and none of the disadvantages.

To attain this, the portable microscope apparatus of the invention includes an apparatus including a first and second cylindrical body member separately and coaxially mounted relative to one another with the first body member including a resilient perimeter eye piece mounted about a forward terminal end thereof to permit viewing interiorly of the first cylindrical body member through a focusing lens. The focusing lens coaxially aligned with a plurality of fixed lenses positioned forwardly of a slide receptacle for a slide member directed therethrough for sampling of various blood samples therewithin. A sample transparency is positionable forwardly of the slide member to permit visual observation of normal and abnormal blood samples for comparison with a sample mounted within the slide member. Illumination means is mounted rearwardly of the slide member.

There has thus been outlined, rather broadly, the more important features of the invention in order that the detailed description thereof that follows may be better understood, and in order that the present contribution to the art may be better appreciated.

There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable microscope apparatus which has all the advantages of the prior art portable microscope apparatus and none of the disadvantages.

It is another object of the present invention to provide a new and improved portable microscope apparatus which may be easily and efficiently manufactured and marketed.

It is a further object of the present invention to provide a new and improved portable microscope apparatus which is of a durable and reliable construction.

An even further object of the present invention is to provide a new and improved portable microscope apparatus which is susceptible of a low cost of manufacture with regard to both materials and labor, and which accordingly is then susceptible of low prices of sale to the consuming public, thereby making such portable microscope apparatus economically available to the buying public.

Still yet another object of the present invention is to provide a new and improved portable microscope apparatus which provides in the apparatuses and methods of the prior art some of the advantages thereof, while simultaneously overcoming some of the disadvantages normally associated therewith.

Still another object of the present invention is to provide a new and improved portable microscope apparatus which may be compactly stored when not being utilized.

Yet another object of the present invention is to provide a new and improved portable microscope apparatus wherein the same permits ease of use and manipulation as well as providing relatively positionable blood sample structure for use in relative analyzing specimens.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
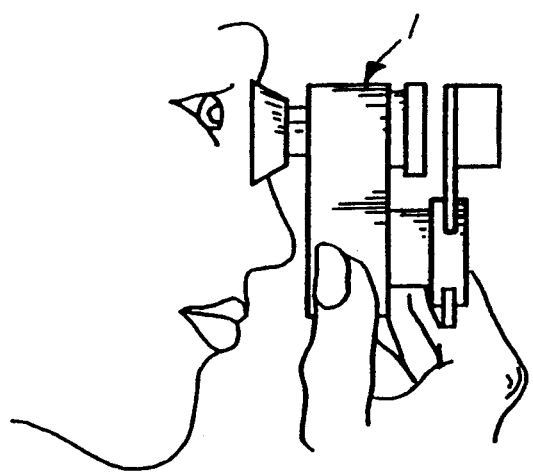
FIG. 1 is an orthographic side view taken in elevation of a prior art microscope apparatus.

With reference now to the drawings, and in particular to FIGS. 1 to 10 thereof, a new and improved portable microscope apparatus embodying the principles and concepts of the present invention and generally designated by the reference numeral 10 will be described.

Figure 2:
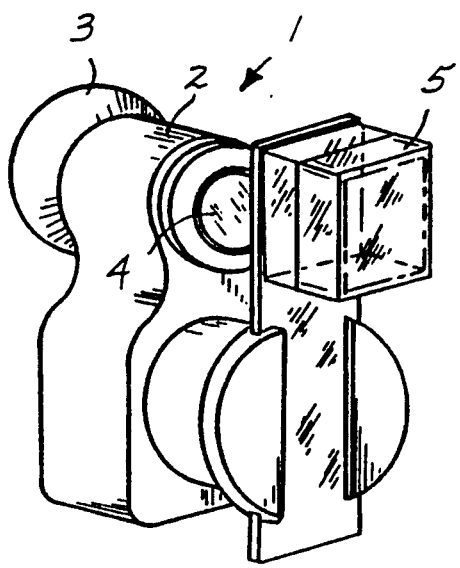
FIG. 2 is an isometric illustration of the prior art microscope apparatus as set forth in FIG. 1.

FIGS. 1 and 2 illustrate a prior art portable microscope organization 1 including a housing 2 including objective eye piece 3 directed through a viewing lens 4 to observe various organizations within a container 5.

More specifically, the portable microscope apparatus 10 of the instant invention essentially comprises a first elongate longitudinally aligned cylindrical body member 11 selectively securable to a second cylindrical body member 12. The first cylindrical body member 11 includes a rear threaded end portion 11a selectively receiving a forward threaded end 12a of a second cylindrical body member 12.

Figure 4:
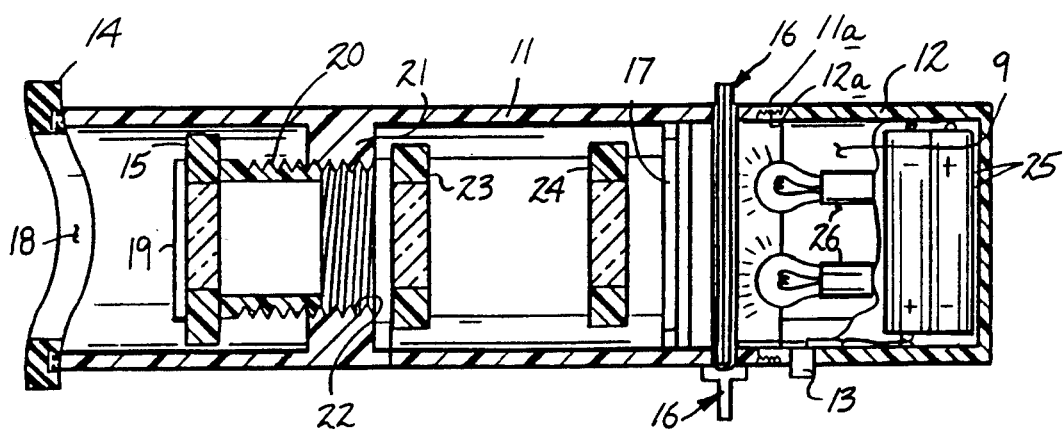
FIG. 4 is an orthographic view taken along the lines 4—4 of FIG. 3 in the direction indicated by the arrows.
Figure 5:
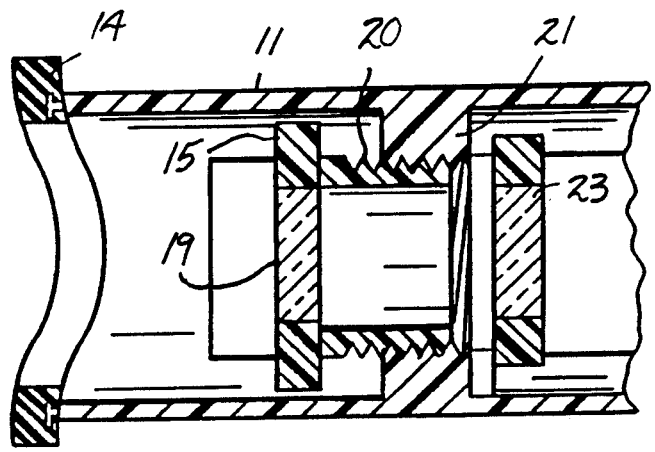
FIG. 5 is an orthographic cross-sectional illustration of the focusing lens in a retracted configuration relative to a support web within the housing structure of the invention.
Figure 6:
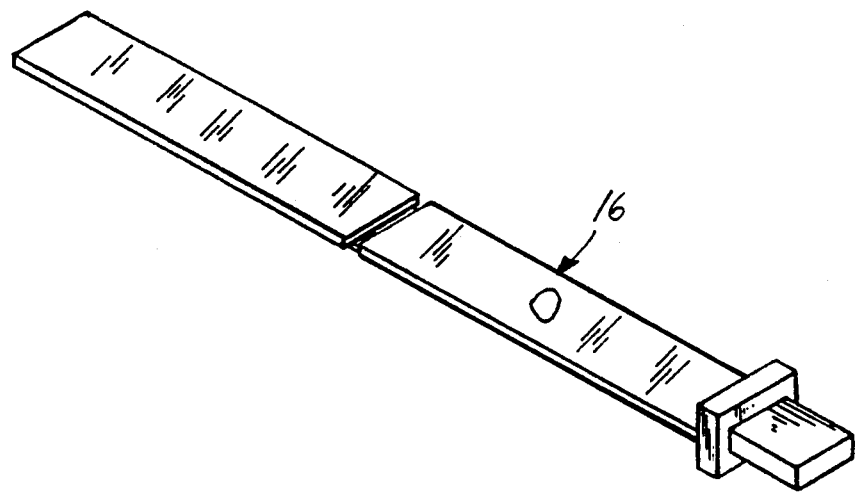
FIG. 6 is an isometric illustration of the slide member of the instant invention.

Removal of the second cylindrical body member 12 defines a cup shaped member permits servicing of illumination compartment 9 defined by the cavity of the second body member 12. A switch 13 directed through a side wall of the second cylindrical body member 12 effects selective actuation of a plurality of illumination members 26 in electrical association with a plurality of battery members 25 as illustrated in FIG. 4 for example. A forward terminal end of the first cylindrical body member includes a resilient perimeter eye piece 14 mounted coextensively about a forward edge of the first cylindrical body member 11 to define a forward opening. A slide member 16 is selectively positionable diametrically aligned with the first cylindrical body member 11 forwardly of the illumination compartment 9. As illustrated, the first and second cylindrical body members 11 and 12 are in axial alignment relative to one another. The forward opening 18 is coaxially aligned with an adjustment ring 15 the adjustment ring 15 projects exteriorly of the first cylindrical body member 11 for manual adjustment thereof. The adjustment ring 15 permits coaxial reciprocation of an associated focusing lens 19 mounted to the adjustment ring 15 and secured coaxially to a threaded cylindrical lens body 20 that is threadedly received within a first body web 21.

Figure 3:
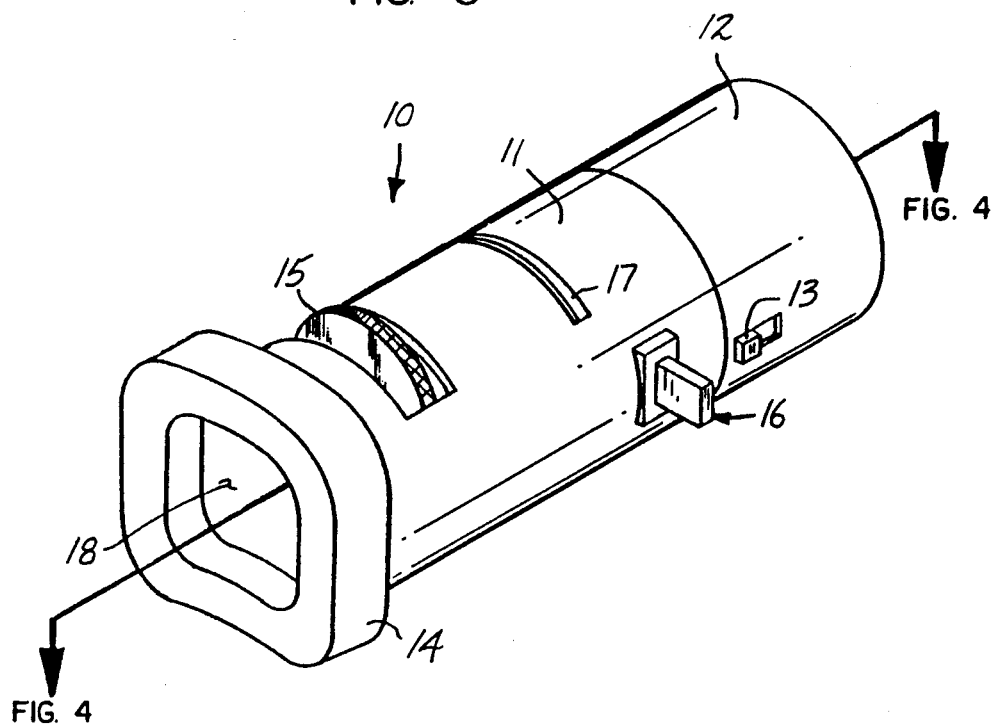
FIG. 3 is an isometric illustration of the instant invention.
Figures 7, 8:
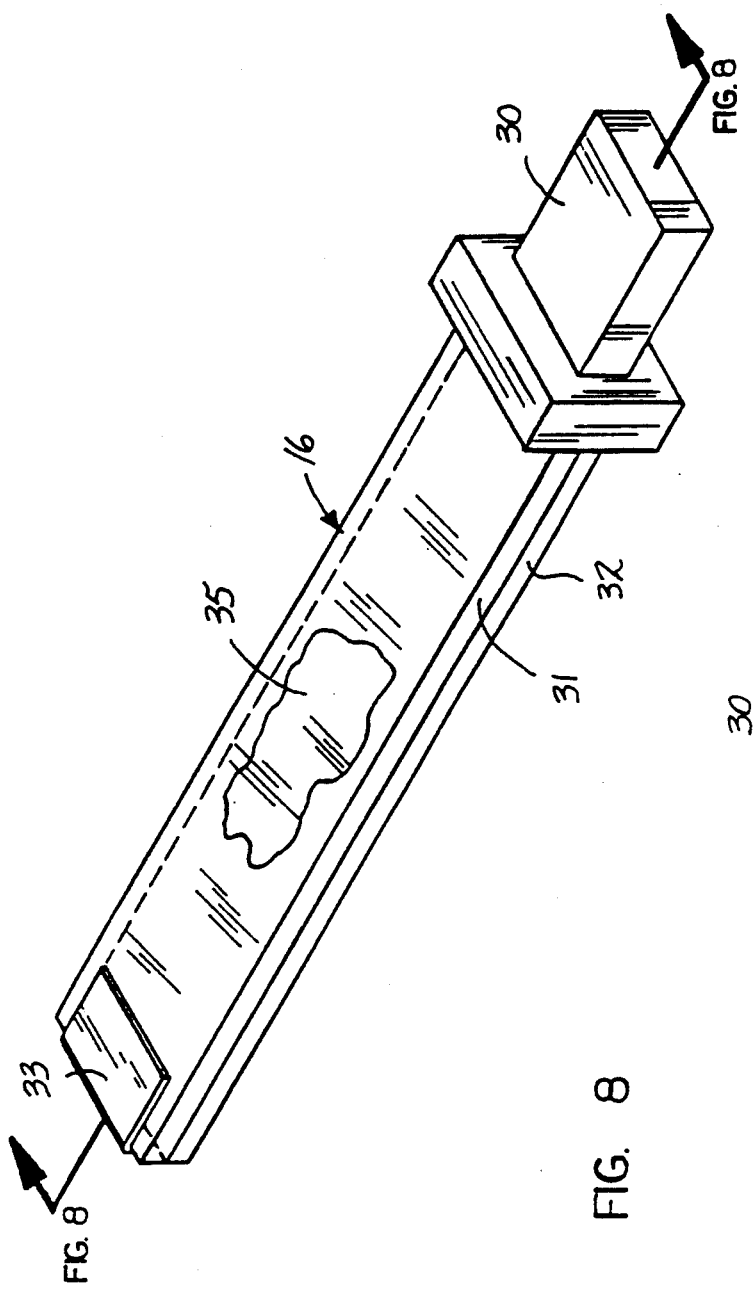
FIG. 7 is an enlarged isometric illustration of the slide member of the instant invention.
FIG. 8 is an orthographic view taken along the lines 8—8 of FIG. 7 in the direction indicated by the arrows.
Figure 9:
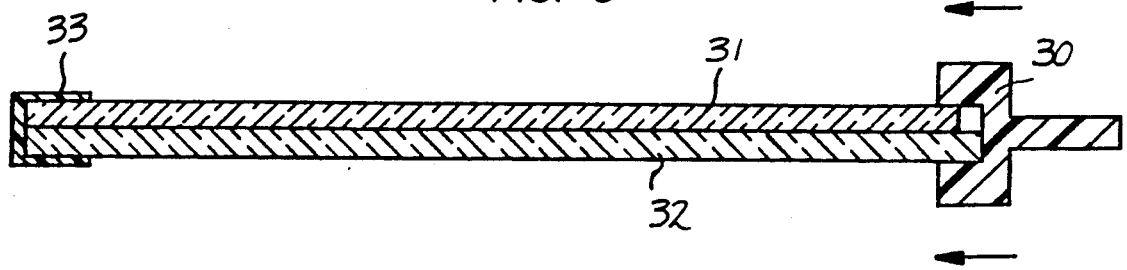
FIG. 9 is an orthographic cross-sectional illustration of the slide member.
Figure 10:
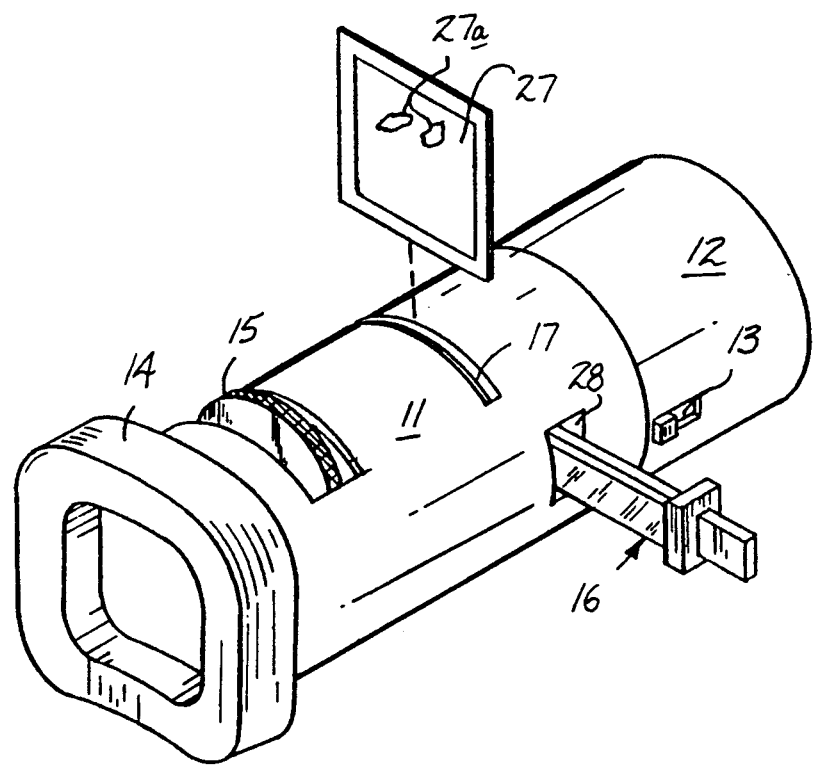
FIG. 10 is an isometric illustration of the instant invention with the comparison slide member removed from the body of the organization.

The first body web 21 is diametrically mounted within the first cylindrical body member 11 and includes an internally threaded adjustmenting board 22 to permit relative reciprocation of the focusing lens 19. A first and second fixed lens 23 and 24 respectively are mounted rearwardly of the focusing lens 19 within the first cylindrical body in coaxially alignment therewith with the slide member 16 positioned rearwardly of and coaxially aligned with the second fixed lens 24 and received within an associated slide member slot 28 in a manner as illustrated in FIG. 10. A slide receptacle slot 17 is directed diametrically through the first cylindrical body member 11 and positioned between the second fixed lens 24 and the slide member 16 as illustrated in FIGS. 3 and 10 for example. The slide member slot 28 positioned to slidably receive a translucent comparison slide 27 therewithin. The translucent comparison slide 27 includes a plurality of sample blood patterns 27a including a normal and viral blood sample pattern that is offset and positioned adjacent a perimeter of the translucent comparison slide 27 to permit visual comparison between the sample blood patterns 27a and a blood specimen 35 mounted within the slide member 16 as illustrated in FIG. 7.

The slide member 16 includes a T-shaped slide member handle 30 that includes a handle cavity 34 to complementarily receive forward terminal ends of a first and second transparent slide 31 and 32 respectively that is secured together pivotally at a rear terminal end thereof by a hinge strap 33 fixedly secured to rear terminal ends of the first and second respective slide portions 31 and 32.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable microscope apparatus for permitting visual observation in comparison of a blood sample wherein the apparatus comprises, a first cylindrical body selectively securable to a second cylindrical body wherein the first and second cylindrical bodies are coaxially aligned relative to one another, and the second cylindrical body includes a cup shaped cavity defining an illumination compartment therewithin, and the illumination compartment including illumination means therewithin selectively actuatable to effect selective actuation of the illumination means, and the first cylindrical body member including a forward terminal end coaxially aligned with and spaced from the second cylindrical body and the forward cylindrical end defining a forward opening, and a first body web fixedly and diametrically mounted within the first said cylindrical body adjacent said forward opening, first body web adjustably mounting a focusing lens, and adjusting means for axially mounting and adjusting the focusing lens relative to the first body web, and at least one fixed lens member mounted rearwardly of the focusing lens within the first cylindrical body member and coaxially aligned relative to the focusing lens, the said at least one fixed lens positioned between the focusing lens and the illumination means, and a slide member selectively receivable within the first cylindrical body member between the fixed lens and the illumination means.

2. Apparatus as set forth in claim 1 including a slide member slot diametrically directed through the first cylindrical body member to selectively receive the slide member therewithin.

3. Apparatus as set forth in claim 2 including a slide receptacle slot diametrically aligned with the first cylindrical body member positioned between the fixed lens and the slide member, and a translucent comparison slide selectively mounted and received within the slide receptacle slot.

4. Apparatus as set forth in claim 3 wherein the translucent comparison slide includes a plurality of blood samples positioned within the translucent comparison slide adjacent a perimeter of the translucent comparison slide visually offset from the slide member wherein the slide member is mounted within the slide member slot.

5. Apparatus as set forth in claim 3 wherein the focusing lens is fixedly mounted to a threaded cylindrical lens body, the threaded cylindrical lens body threadedly mounted through the first body web to permit coaxial adjustment of the focusing lens relative to the fixed lens.

6. Apparatus as set forth in claim 5 including a further fixed lens coaxially aligned relative to the fixed lens and mounted within the first cylindrical body member between the slide receptacle slot and the first body web.

7. Apparatus as set forth in claim 6 wherein the forward terminal end of the first cylindrical body member includes a resilient perimeter eye piece coextensively mounted thereto.

8. Apparatus as set forth in claim 7 wherein the slide member includes a first and second transparent slide, the first and second transparent slide each including a rear terminal end, and the rear terminal end of the first and second slide pivotally mounted together including a hinge strap secured to the rear terminal end of the first and second slide, and a T-shaped slide member handle, and the first and second slide including a forward terminal end, the forward terminal end of the first and second slide complementarily received within a handle cavity formed within the T-shaped handle.

* * * * *